J. H. TRUDEL.
TRAIN LINE COUPLING.
APPLICATION FILED MAY 17, 1919.
1,369,579.
Patented Feb. 22, 1921.
3 SHEETS—SHEET 1.
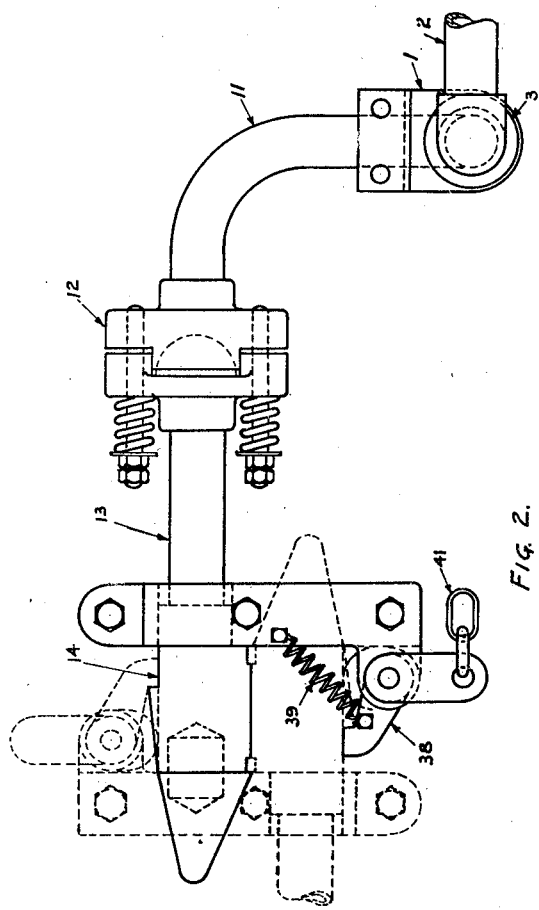
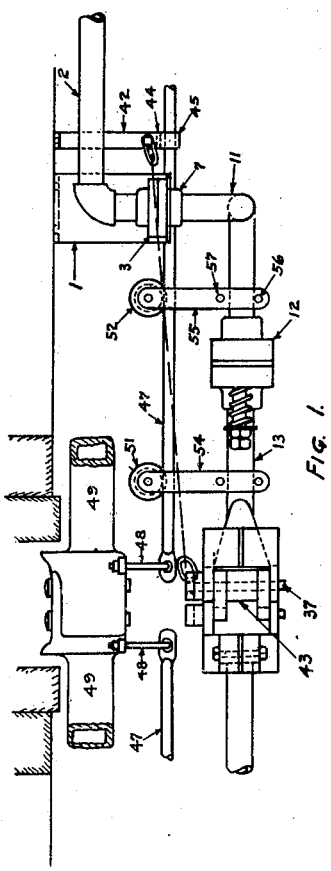
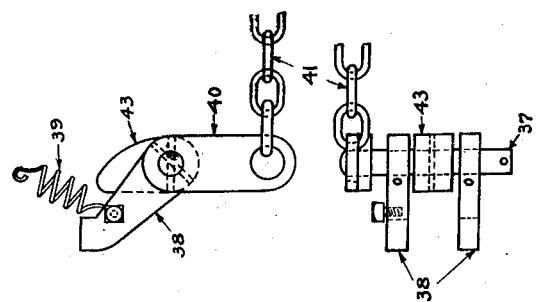
INVENTOR.
BY
ATTORNEY.

J. H. TRUDEL.
TRAIN LINE COUPLING.
APPLICATION FILED MAY 17, 1919.
1,369,579.
Patented Feb. 22, 1921.
3 SHEETS—SHEET 2.
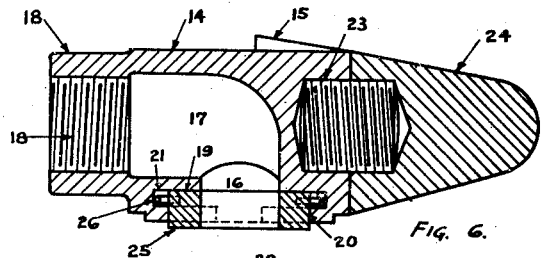
FIG. 6.
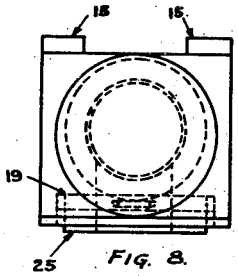
FIG. 8.
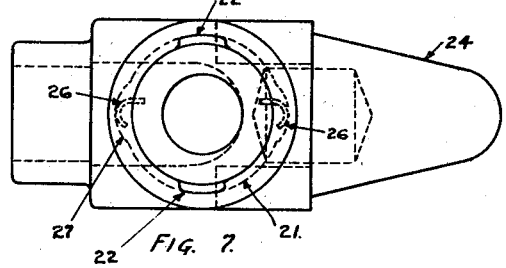
FIG. 7.
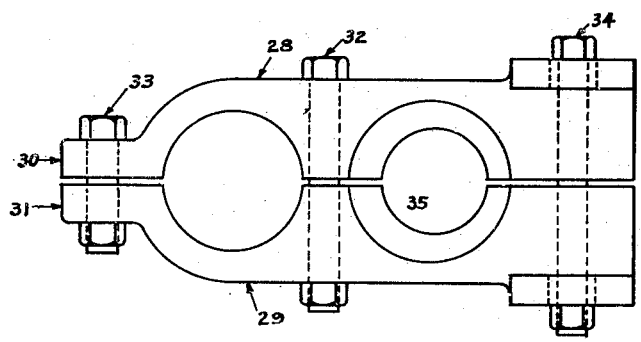
FIG. 4.
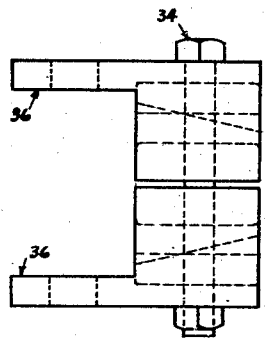
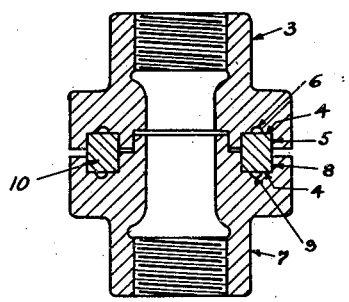
FIG. 5.
INVENTOR
J. H. Trudel
BY
ATTORNEY.

J. H. TRUDEL.
TRAIN LINE COUPLING.
APPLICATION FILED MAY 17, 1919.

1,369,579.

Patented Feb. 22, 1921.
3 SHEETS—SHEET 3.

INVENTOR.
J H Trudel
BY
ATTORNEY.

UNITED STATES PATENT OFFICE.

JOSEPH HENRY TRUDEL, OF MONTREAL, QUEBEC, CANADA, ASSIGNOR OF ONE-HALF TO ALBERT DENIS DENIS, OF MONTREAL, QUEBEC, CANADA, AND ONE-HALF TO TRUDEL AUTOMATIC TRAIN CONNECTOR COMPANY, INCORPORATED, OF MONTREAL, QUEBEC, CANADA.

TRAIN-LINE COUPLING.

1,369,579.   Specification of Letters Patent.   Patented Feb. 22, 1921.

Application filed May 17, 1919. Serial No. 297,908.

*To all whom it may concern:*

Be it known that I, JOSEPH HENRY TRUDEL, a subject of the King of Great Britain, and residing at 4332 Notre Dame street west, in the city and district of Montreal, in the Province of Quebec, in the Dominion of Canada, have invented a new and useful Train-Line Coupling, of which the following is the specification.

The invention relates to train line couplers as described in the present specification and illustrated in the accompanying drawings that form part of the same.

The invention consists essentially of the novel construction and arrangement of parts, whereby the coupled members are constantly held together during connection and the coupling and uncoupling accomplished with great facility.

The objects of the invention are to eliminate the necessity of coupling the air brake and other train lines by hand and thereby avoid much danger to life; to insure a thoroughly good joint at the point of connection and consequently prevent leaks and poor service due thereto; to automatically couple and uncouple the train lines coincidently with the coupling of the cars; to limit the weight of the equipment, so as to conserve power and lessen the cost of maintenance as well as increase the efficiency by the reduction of the number of parts and lightening up such parts without affecting their operability or durability; and generally to provide a comparatively cheap and most serviceable coupling device.

In the drawings, Figure 1 is a side elevation, showing the coupling members as they appear attached to a car body and draw bar.

Fig. 2 is a plan view of the coupling members as they meet.

Fig. 3 is an enlarged detail of the latch mechanism, showing the accompanying cam for jamming the coupled joint member and maintaining it in that position.

Fig. 4 is an enlarged detail, showing an elevation of the bracket supporting the latch and cam.

Fig. 5 is an enlarged sectional view showing the connection of the coupling device to the main line.

Fig. 6 is a longitudinal sectional detail of the head forming a coupling member.

Fig. 7 is a detail, showing a face view of the head forming a coupling member.

Fig. 8 is a detail showing an end view of the head forming a coupling member.

Like numerals of reference indicate corresponding parts in each figure.

Figure 10:
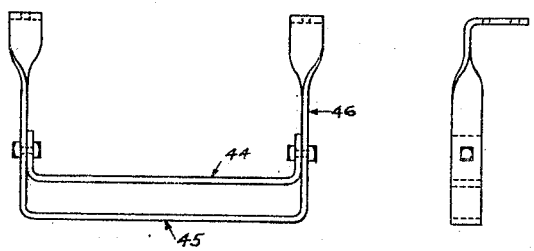
Fig. 10 is a detail of rear rail bracket.
Figure 11:
Fig. 11 is a detail of rail support from draw bar.
Figure 12:
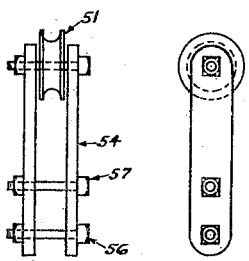
Fig. 12 is a detail of hanger for flexible connections.
Figure 13:
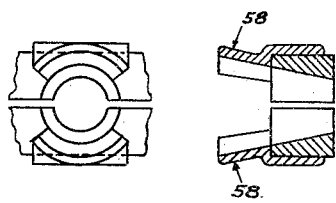
Fig. 13 is a detail showing an elevation and side sectional view of the guides.

Referring to the drawings, the bracket 1 is shown as secured to the body or frame of the car and into this bracket the train line or air, steam or other pipe 2 extends and is elbowed and threaded to connect with the joint member 3, which is formed in the annular face 4 with an annular recess 5 and a groove 6 in the center of said recess. The other joint member 7 is formed with a similar recess 8 and groove 9 and the ring bushing 10 is introduced into said recesses over beds of graphite when the members 3 and 7 are brought together.

The lower member 7 is rotatably supported in the bracket 1 and is screw-threaded on to the bent pipe 11, which beyond the bend is secured to a member of the universal ball joint 12.

The pipe 13 continues from the other member of the joint 12 and is screw-threaded into the head 14. The head 14 is substantially in rectangular block form having on the outer side the catches 15 forming part of the latch mechanism and on the inner side the opening 16 leading into the passage 17, which turns to meet the threaded tubular entrance 18, into which the pipe 13 is screw-threaded. The opening 16 is surrounded by the ground face 19 which forms the bed of the annular recess 20, the side wall of said recess 20 having the locking groove 21 and the slots 22 leading to said grooves.

The end of the head 14 is formed with a threaded socket 23 and the turned and tapering nose 24 which is rearwardly flush with the sides forming the catches 15. The seat 25 formed with inner and outer ground faces is mounted on the ground face 19 and is held in place by the spring wires 26 projecting from the slots 27 inserted into groove 21, through the slots 22 and settling in the deepening of said groove for locking purposes.

The head 14 is held between the straps 28 and 29, said straps being brought together at the ends to the lugs 30 and 31 and secured by the bolts 32 and 33 over the tubular entrance portion 18 and further held by the bolt 34, the squared part of said head abutting said straps. The straps 28 and 29 extend beyond the inner side of the head 14 and form a socket 35 for a similar head from a like equipment on another car and adjacent to ends have the lateral lugs 36 therefrom forming bearings for the latch shaft 37 carrying the latch 38 coacting with the catches of the head of the coöperating equipment similar to the catches 15.

The latch 38 is held to its operating position by the spring 39 extending from the latch point to its fastening on the strap 28.

The crank 40 is fixedly mounted on the shaft 37 and the chain 41 extends from the end of said crank 40 to the bracket 42 secured to the car body.

The cam 43 is also fixedly mounted on the latch shaft 37 and engages the head 14 between the catches 15 constantly during the connection of the coöperating equipments and as there is a cam on each equipment the two heads will be firmly pressed together.

The bracket 42 is formed with the transverse bars 44 and 45 arranged one above the other, and secured to the vertical rods 46 and forming a sliding way therebetween for the rail 47. The front end of the rail is suspended by the rod 48, which is secured to the draw bar 49 of the car by the bolts 50 and permitting a limited side play for the front end of the rail 47. The trolley wheels 51 and 52 are mounted on the rail 47 and the hangers 54 and 55 depend from the axles of said trolleys in pairs straddling the pipes 11 and 13, said pipes being supported between the lower pin 56 and the upper pin 57.

It will now be seen that the coupling device is flexibly supported from the joint connecting it to the main line to the head meeting the next car equipment and in order to insure the meeting of the latch members of the two equipments in two cars being coupled, the guides 58 are provided, which direct the nose of one head into the socket adjoining the latch in the other equipment.

In the operation of this coupling mechanism, the cars are brought together in the usual way and the nose of one head finds its way to the corresponding socket in the other equipment and the nose of the head of the latter equipment finds the socket in the first equipment.

The consequence of this is that the latches of the two equipments close in to the end of the catches and are pulled therebehind by the springs, as the chain in the coupled position of the cars is loose and offers no opposition to the operation of the spring on the latch, therefore the latches engage the catches and simultaneously the connecting joint seats come together. The cams come into operation as soon as the latch dogs engage the catches and these cams turn against the back or outer side of the heads forcing the inner sides toward one another and pressing the seats of the connecting joint very firmly together.

The parting of the coupling is effected by the tightening up of the chains, as after the regular coupling is separated there is an immediate pull on the whole flexible connection forming the coupling device from the main line joint connections to the connecting meeting joints and this tightens on the chains of both equipments and pulls on the cranks, which turn the latch shafts and release the latches and effect the parting.

Figure 9:
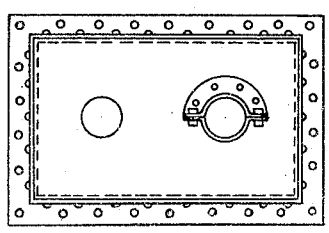
Fig. 9 is a detail showing a preferred form of casing for the head.

In Fig. 9 a form of casing is shown, which covers the head and is itself a well known type of cover for under parts in railroad rolling stock. The cover 59 is formed with a metal rear side secured to the metal straps 28 and 29 and extending forwardly in the collapsible sides 60, having a leather face 61 at the front, with a suitable opening through which the coupling head projects.

In this invention, many changes may be made in regard to the various parts hereinbefore set forth in detail without departing from the spirit of the invention, and so long as these changes are within the scope of the claims for novelty following the protection afforded shall not be invalidated.

What I claim is:—

1. In a train line coupler, a pipe line, a flexible connection from said pipe line, a head at the outer end of said flexible connection, a latch mechanism and socket supported from said head, a flexible tying member secured at one end to a permanent and rigid fixture and at the other to an operative part of said latch mechanism and a cam locking member mounted on the latch shaft and rotating therewith to and from its locked position.

2. In a train line coupler, a coupling head and flexible connections therefrom to the train line adapted to extend forwardly and yield rearwardly in operation and thereby govern the coupling and uncoupling of the head with a corresponding socket of another equipment and a cam locking member mounted on a shaft automatically rotated by contact with the coöperating coupler.

3. In a train line coupler, a coupling head and socket for a like head, a latch mechanism adjoining said socket and adapted to lock in said like head, a cam locking member operated coincidently by the rotation of the shaft of said latch mechanism and a flexible connection to the train line governing said latch mechanism.

4. In a train line coupler, a coupling head having a passage from one end to one side and a nose on the other end, a spring-held latch having its shaft journaled on said head, a cam locking member fixedly mounted on said shaft and flexible connections from said head to the train line.

5. In a train line coupler, a coupling head having a passage from one end to one side and a ground seat at the side opening, flexible connections screw-threaded into the passage end of said head and connecting the latter to the train line, a latch automatically operated and fixedly mounted on a shaft journaled on said head, and a cam locking member on said shaft.

6. In a train line coupler, a coupling head having a passage from one end to one side and an annular recess surrounding the side opening, a seat having a ground face and locked in said annular recess, flexible connections secured to the passage end of said head and forming communication from the train line and an automatic latch turning a cam shaft and a cam lock on said shaft.

7. In a train line coupler, a coupling head having a passage from one end to one side, a threaded entrance at said end, an annular recess surrounding the side outlet and a ground seat fastened therein and removable therefrom, a tapered nose screw-threaded into the front end and flaring catch projections from one side flush with said nose, a latch coöperating with similar catches in a like equipment and turning a cam shaft, means for automatically operating said latch, and flexible connections from the threaded entrance of said head to the train line and a cam lock on said shaft.

8. In a train line coupler, a rotatable joint having its upper member secured to the train line and its lower member rotatably supported from the car frame, each of said members having an annular bushing recess and an annular groove in each of said recesses, graphite in the beds of said recesses, a bushing forming the joining members and introduced in said recesses, a coupling head, and flexible connections from said joint to said head.

9. In a train line coupler, a coupling head having a ground face at the side, a rotatable joint forming the connection to the train line, a universal joint connected to the rotatable joint, and a tubular section from said universal joint to said head and a rotatable cam lock on the other side of said head.

10. In a train line coupler, a coupling head, a socket bracket rigidly secured to said head and projecting laterally therefrom, a latch shaft journaled in said socket bracket, a latch mounted on said shaft and spring-held to engagement, a crank mounted on said shaft, a chain permanently and fixedly connected at one end to a member rigid with the car body and at the other to said crank, a flexible connection from said head to the train line and a cam lock fixedly mounted on said latch shaft and turning therewith into engagement with the head.

Signed at the city of Montreal, Quebec, Canada, this 10th day of May, 1919.

JOSEPH HENRY TRUDEL.